United States Patent Office 3,598,869
Patented Aug. 10, 1971

3,598,869
OXIDATION OF CYCLOHEXANE TO NYLON PRECURSORS
Peter J. Volpe and William J. Humphrey, Corpus Christi, Tex., assignors to Celanese Corporation, New York, N.Y.
No Drawing. Continuation-in-part of application Ser. No. 519,296, Jan. 7, 1966. This application Dec. 5, 1967, Ser. No. 687,997
Int. Cl. C07c 55/14
U.S. Cl. 260—533C          5 Claims

ABSTRACT OF THE DISCLOSURE

A reaction product consisting of (a) cyclohexanone and cyclohexanol (KA) and (b) a mixture of carboxylic acid derivatives of cyclohexane comprising predominantly hydroxycaproic acid and adipic acid (COP acids), in which the ratio of COP acids to KA is particularly suitable for subsequent conversion to nylon salt by converting the COP acids to hexamethylene-diamine and the KA to adipic acid, is obtained by oxidizing cyclohexane in the liquid phase at a conversion per pass between 14% and 30%, with a reaction retention time between about 6 minutes and 80 minutes, and in the presence of a catalyst comprising at least one of the group consisting of cobalt and chromium, the conversion per pass and the catalyst composition being coordinated one with the other to attain the desired ratio of COP acids to KA in the oxidation product. The chromium:cobalt ratio in the oxidation catalyst is a significant independent variable which can be adjusted to control the COP acids:KA ratio at a given cyclohexane conversion rate.

---

This is a continuation-in-part of patent application Ser. No. 519,296, filed Jan. 7, 1966 now abandoned.

This invention relates to the production of compounds which are precursors in the manufacture of nylon 6–6, particularly adipic acid and hexamethylenediamine. More specifically, the invention relates to the production of compounds which are precursors in the manufacture of adipic acid and hexamethylenediamine; i.e. it relates to manufacturing a mixture of cyclohexanone and cyclohexanol (commonly referred to as KA) which can be oxidized, as by nitric acid oxidation, to produce adipic acid, and a mixture of carboxylic acids comprising predominantly 6-hydroxycaproic acid and adipic acid, which can be converted to hexamethylenediamine by a series of operations including esterification, hydrogenolysis of the esters to the corresponding diols, and ammonolysis of the diols to hexamethylene-diamine as described in U.S. Pat. No. 3,268,588.

A significant feature of the invention is the oxidation of cyclohexane under reaction conditions, including proper choice of oxidation catalysts, such that the ratio of COP acids to KA in the oxidation product can be made such that the ultimate products, i.e. adipic acid and hexamethylenediamine, can be produced in a mole ratio of about 1:1 as required for the manufacture of nylon salt.

It is well known that cyclohexane can be oxidized to produce the mixture of cyclohexanone and cyclohexanol known as KA, which is then normally converted to adipic acid by oxidation with nitric acid. The adipic acid thus produced is generally then divided into two portions, one being used as such in manufacturing nylon salt and the other being converted to adiponitrile which is then converted to hexamethylenediamine (HMDA). The HMDA and adipic acid are then reacted to produce nylon salt. It has also been generally recognized that the direct production of adipic acid by air oxidation of cyclohexane is a difficult and relatively inefficient mode of operation when commercial quantities of fiber grade adipic acid are desired. Specifically, chemical efficiencies of this air oxidation to adipic acid have been relatively low and the product is contaminated with lower dicarboxylic acids the removal of which from the product is difficult and costly. Therefore, in the usual mode of operation characteristic of the prior art, cyclohexane is oxidized in the liquid phase with air to produce KA and the remainder of the reaction product is either discarded or recycled to the oxidation step as desired. In other words, the primary desired cyclohexane oxidation product has heretofore been KA, and the literature is replete with patents and other publications describing methods for producing KA under optimum conditions of conversion and efficiency.

Conversely, the direct conversion of cyclohexane to adipic acid by air oxidation has heretofore been regarded as inefficient and also unsatisfactory from the standpoint of product quality, and adipic acid has heretofore been regarded as an undesirable minor by-product in the production of KA.

Because of the foregoing considerations those currently-employed processes which employ cyclohexane as a raw material for producing HMDA do so by first converting cyclohexane to KA, and then converting the KA to a pure grade of adipic acid by oxidation with nitric acid. This is expensive both in raw material requirements and in investment costs, since the oxidation with nitric acid requires a heavy capital investment and a great amount of expensive solids-handling apparatus to prepare the pure adipic acid approximately half of which then has to be converted to hexamethylenediamine.

The art has long sought a more efficient method for producing precursors of HMDA and adipic acid in a manner which requires minimum processing, maximum chemical efficiency, and minimum capital investment. According to the present invention this is accomplished by oxidizing cyclohexane with air under such conditions and in the presence of such specific catalysts as to produce in one oxidation operation both KA and a mixture comprising adipic acid and 6-hydroxycaproic acid in such proportions that, upon further processing, fiber grade adipic acid and hexamethylenediamine (HMDA) are formed in the correct ratio for conversion to nylon salt. The unique economic advantage of the invention lies both in its use of one large cyclohexane oxidation unit instead of two smaller ones (i.e. one to produce KA and one to product COP) and in its provision of very high chemical efficiency which is due in part to making available in useable form the adipic acid and adipic acid precursors which are at best undesirable by-products in those prior art processes which employ KA as the primary intermediate for producing both adipic acid and HMDA.

The basis of the invention is the discovery that it is possible to produce both KA and COP acids which contain a high proportion of hydroxycaproic and adipic acids in high yields and at industrially attractive reactor output rates by oxidizing cyclohexane in the liquid phase in a reactor which is operated under conditions in which the cyclohexane conversion per pass is carefully controlled and in which an oxidation catalyst is employed the composition of which is also carefully controlled. The cyclohexane conversion and the nature of the oxidation catalyst are interdependent, and are coordinated with one another to obtain the desired KA:COP acids ratio in the oxidation product. The manner in which these variables are coordinated with one another will be described more fully below. Also to be described are methods whereby the two reaction products (KA and COP acids) are recovered in useable form.

In controlling the conversion of cyclohexane per pass through the oxidation reactor, the factors of primary importance are temperature, pressure, the retention time of the liquids passing through the reactor, the ratio of oxidizing medium to cyclohexane fed into the reactor, and the presence or absence of an oxidation catalyst.

Of the above-listed variables, the pressure is relatively less important, but it should be broadly between 100 p.s.i.g. and 1000 p.s.i.g. (measured against a normal atmospheric pressure) preferably between about 450 p.s.i.g. and 550 p.s.i.g. The pressure must be high enough to maintain a liquid phase in the reactor in any event. The temperature maintained in the reactor should be between 135° C. and 180° C., 150° C. to 160° C. being particularly useful.

The retention time of the liquids passing through the oxidation reactor should be controlled between about 6 minutes and 80 minutes, with particularly useful results being obtained when it is controlled between about 35 minutes and about 45 minutes. Retention time is controlled by regulating the throughput of cyclohexane through the reactor, unoxidized cyclohexane contained in the reaction product withdrawn from the reactor being recovered and recycled to the reactor by any of a number of techniques, such as distillation, obvious to those skilled in the art.

The conversion of cyclohexane per pass through the reactor is controlled by regulating the amount of oxidizing medium fed into the reactor. The oxidizing medium is typically air, but any gas comprising molecular oxygen can be employed so long as its other components are materials (e.g. inert gases such as nitrogen) which will not affect the oxidation reaction adversely. Typically the oxygen containing gas contains between 15% and 30% oxygen. In practicing the invention the oxygen-containing gas is introduced into the oxidation reactor at the rate of at least 0.05 mole of molecular oxygen per mole of cyclohexane introduced into the reactor. The cyclohexane conversion is increased by increasing the ratio of introduced oxygen to introduced cyclohexane and conversely, of course, conversion is reduced by reducing this ratio. The adjustment of this ratio is made in conjunction with a conventional reactor material balance, which involves only ordinary chemical analyses and flow measurements which are obvious in the art and outside the scope of the present invention. One overriding process control should be mentioned, however, for reasons of safety. This is that the oxygen concentration in the gases ultimately vented from the reaction system (i.e. the gas resulting when the gases evolved from the reactor have been passed through conventional condensers and/or absorbers for recovering vapors such as those of cyclohexane) should be no more than about 5% or 6% by volume when the cyclohexane content is 0.1%. Oxygen concentrations much above this limit indicate the beginning of a potentially dangerous condition, and the rate of oxygen introduction into the reactor should be reduced until the oxygen content of the vent gases drops to 6% or below.

The liquid phase or reaction mass contained in the oxidation reactor is predominantly cyclohexane admixed with the reaction products formed from it at the cyclohexane conversion rate being employed. No other reaction solvent, such as acetic acid, is employed. An oxidation catalyst is maintained in this liquid phase, comprising a hydrocarbon-soluble compound, such as naphthenate, of a suitable catalytic metal. In the practice of the present invention the catalytic metal is chromium, cobalt, or a mixture of cobalt and chromium as will be described below. The prior art has recognized that both these metals, typically as the naphthenates, are catalysts for the oxidation of cyclohexane. It has not been recognized, however, that chromium and cobalt have opposing effects in directing the distribution of the oxidation products. It has now been discovered that, at a given cyclohexane conversion rate, chromium has the effect of controlling the product distribution in the direction of a high COP:KA ratio while cobalt controls in the direction of a high KA:COP ratio, and that mixtures of the two control the reaction product distribution toward intermediate ratios. Of the two metals, cobalt has been discovered to have a relatively more pronounced effect, so that introduction of a relatively small proportion of cobalt into a chromium-catalyzed system has a pronounced effect in increasing the ratio of KA to COP acids in the reaction product. By mixing the cobalt and chromium catalysts in particular weight ratios it is possible to vary the ratio of COP acids to KA over a wide range. The quantity of oxidation catalyst maintained in the reactor, as distinguished from its composition, is of relatively less importance. Catalyst concentrations between 1 p.p.m. and 200 p.p.m., calculated as the metal, are normally employed, although higher concentrations can be employed if desired. Typically, 2 to 10 p.p.m. of the catalyst, calculated as the metal, is employed. As has just been said, the nature of the catalyst is more important than its concentration. Specifically, a catalyst containing 4.8 p.p.m. of chromium and 0.2 p.p.m. of cobalt will produce a reaction product in which the COP acids:KA ratio is substantially lower than that produced in the presence of 5 p.p.m. of chromium with no cobalt. In other words, cobalt is the dominating catalyst and has an appreciable effect in small quantities.

In practicing the invention a given desired ratio of COP acids to KA is obtained by adjusting the reactor conversion and the catalyst composition as follows:

The basic principles are (a) increasing conversion increases the COP acids:KA ratio in the product, and (b) chromium favors a high ratio while cobalt favors a low ratio. Thus, for example, operating the reactor at low conversion level, e.g. around 14% or 15% up to about 23%, with a chromium catalyst results in a product distribution which approximates that obtained when the reactor is operated at conversion around 23% to 30% with cobalt catalyst. At conversions intermediate between 14% and 30% a mixed catalyst can be employed as described above to "trim" the product ratio at a fixed reactor conversion rate. It is thus possible, and within the scope of the invention, to operate the reactor at a low or at a high conversion (within the range of 14% to 30% approximately) and obtain the desired COP acids:KA ratio. A preferred embodiment, however, is to operate in the lower part of the range of conversion (e.g. around 14% to 23%) with chromium catalyst and no cobalt. The particular advantage of this mode of operation is that it has been unexpectedly discovered that the COP acids produced by this mode of operation are unusually free of certain contaminants which are precursors of compounds which are troublesome impurities in HMDA produced by converting the COP acids through esterification, hydrogenolysis, and ammonolysis.

The process of the invention can be employed to produce either COP acids or KA in some excess over the quantity required for ultimate conversion to nylon salt. For example, operation with chromium catalysts at the lower end of the conversion range or even below (e.g. at around 12% conversion) can be employed to produce an excess of KA which can be employed for other purposes, e.g. for sale, in addition to the KA and COP needed for use in nylon manufacture. Likewise, operation at conversions around 30% and with cobalt catalyst can be employed to produce an excess of COP acids for use in other operations such as the manufacture of plasticizers. The maximum acid:KA ratio, of course, results from using chromium catalyst and high conversion, while the maximum KA:acids ratio is obtained with cobalt at low conversion.

The COP acids formed by the process of the invention are a mixture which comprises predominantly adipic acid and 6-hydroxycaproic acid but which also includes lesser quantities of the lower homologues such as, for example, succinic acid. Because the COP acid product is a mixture of this nature it is difficult to analyze it component by component and the yield data discussed herein are therefore in some instances expressed in weight units of this mixture rather than in molar quantities of adipic acid and hydroxycaproic acid. By converting the COP acids to HMDA, however, by esterification, hydrogenolysis, and ammonolysis it is demonstrable that this material comprises predominantly hydroxycaproic and adipic acid and that a given weight ratio of COP acids to KA in the oxidation product is suitable for ultimate conversion to nylon salt. The efficiency of conversion of hydroxycaproic and adipic acids to hexamethylenediamine by the process described in U.S. Pat. 3,268,588 is about 79%, and the efficiency in converting KA to adipic acid by nitric acid oxidation is approximately 90%.

Any conventional oxidation reaction system can be employed in practicing the invention, including tubular reactors with cocurrent once-through passage of liquid and gaseous reactants, recirculating loop-type tubular reactors, vertical column-type reactors with countercurrent flow of liquid reactants and oxygen, mechanically agitated or pump-recirculated tank-type reactors, and tank-type reactors which are agitated only by the action of the oxygen-containing gas bubbled into the lower portion together with internal convection effects. The invention is applicable most particularly to reactors, of whatever type, in which there is recirculation of the contents such that the composition of the reaction mass is substantially uniform throughout the bulk of the reaction zone. Tank-type reactors agitated only by convection and the action of the sparged-in air inherently have such recirculation. Any of the several methods known in the art for controlling the reactor temperature can be employed. That is, cooling coils within the reactor can be employed, the reactor contents can be circulated continuously through an external heat exchanger, or the heat of reaction can be removed continuously by allowing vapors to evolve from the surface of the reaction mass into a reflux condenser.

The recovery of the COP acids and the KA from the reaction product can be accomplished by distillation, extraction, or a combination of these methods. For example in recovering the products by distillation the entire reaction product, with water added thereto, is first introduced into a distillation column in which the unreacted cyclohexane which may be present is removed overhead as an azeotrope. Additional water is then added to the residue of this distillation, and the residue is then introduced into a second distillation column in which the KA is removed overhead as a water azeotrope. The COP acids, predominantly adipic acid and hydroxycaproic acid, remain in the residue. In producing nylon salt, the KA is then oxidized to adipic acid and the COP acids are subjected to further processing, e.g. as described in U.S. Pat. 3,268,588, to produce hexamethylenediamine.

An alternate recovery process entails water extraction. By this process the entire reaction mass is taken through a water extraction stage in which the COP acids, mainly 6 carbon acids, are extracted into the water phase. The water and the hydrocarbon phase (containing the KA and any residual unreacted cyclohexane) are then separated, preferably by decantation. The COP acids are then converted to hexamethylenediamine as above. The KA and the residual unreacted cyclohexane are preferably separated by distillation prior to oxidizing the KA to adipic acid with nitric acid. The KA as initially recovered from the reaction product is commonly about 95% pure on the anhydrous basis, but in the examples which are to follow, and in the claims, quantitative expressions regarding KA are on the basis of a mixture of pure cyclohexanone and cyclohexanol.

EXAMPLE I

Cyclohexane was oxidized continously with air in a reactor the temperature of which was controlled by a medium circulating in heat transfer relationship with the reaction mass contained in the reactor. The reactor was a horizontal pressure vessel having a length:diameter ratio of about 0.7 and containing a liquid reaction mass approximately 40 inches deep. The air was sparged into the bottom of the reactor providing a gentle internal circulation of the reaction mass.

The reactor was maintained at a temperature of 155° C. and a pressure of 500 p.s.i.g. (measured against normal atmospheric pressure). As oxidation catalyst there was maintained in the reaction mass contained in the reactor approximately 7 p.p.m. of chromium naphthenate, calculated as the metal. Liquid retention time in the reactor was controlled at approximately 40 minutes by controlling the throughput rate of cyclohexane. The oxygen:cyclohexane ratio in the reactants fed into the reactor was 0.35 mole of oxygen per mole of cyclohexane; under these conditions the cyclohexane conversion per pass was 16.5%.

The reaction product was continuously removed from the reactor, water was added to it, and it was then subjected to an azeotropic distillation to remove residual unreacted cyclohexane. The residue of this first distillation was then subjected to a second azeotropic distillation whereby the KA content was recovered overhead as an azeotrope. The residue of the second distillation was composed almost entirely of 6 carbon carboxylic acids, predominantly adipic acid and hydroxycaproic acid. The weight ratio of the anhydrous COP acids recovered in the residue to anhydrous KA recovered in the distillate was 2.5. The yields of COP 6 carbon atom acids and KA, based on cyclohexane consumed, were 34.6% and 35.5% respectively.

Upon oxidizing the KA to adipic acid by nitric acid oxidation and converting the COP acids to hexamethylenediamine by esterification, hydrogenolysis, and ammonolysis, adipic acid and hexamethylenediamine were ultimately produced in a mole ratio of about 1.15.

EXAMPLE II

Cyclohexane was oxidized continuously with air at a temperature of 156° C. and under reactor pressure of 500 p.s.i.g. in the presence of 5 p.p.m. of a chromium naphthenate catalyst (calculated as the metal). The oxygen:cyclohexane ratio in the feed was 0.49 mole of oxygen per mole of cyclohexane fed. The reactor residence time was about 42 minutes and the cyclohexane conversion per pass was 21%. The reactor was the same as employed in Example I.

The reaction product was worked up into its component parts as described in the foregoing example. The weight ratio of anhydrous cyclohexane oxidation product (COP) acids to anhydrous KA was 2.8, and the yields of 6 carbon COP acids and KA, based on consumed cyclohexane, were 42.4% and 32% respectively.

Upon conversion of the KA to adipic acid and of the COP acids to hexamethylenediamine as described above, the molar ratio of the resulting adipic acid to the resulting HMDA was about 0.85.

EXAMPLE III

The reactor described in Examples I and II above was operated at 154° C. and 500 p.s.i.g. pressure with a retention time of 40 minutes. The ratio of oxygen to cyclohexane in the reactor feed was 0.48 mole of oxygen per mole of cyclohexane, and the cyclohexane conversion per pass was 25%. A catalyst was maintained in the reaction mass consisting of a cobalt-chromium mixture containing 4.8 p.p.m. chromium and 0.2 p.p.m. cobalt, both calculated as the metal, introduced into the reactor in the form of their respective naphthenate compounds.

Upon processing the reaction product as described in the foregoing examples, it was observed that the weight ratio of anhydrous COP acids to anhydrous KA was 1.8. The yields of KA and 6 carbon atom COP acids were 37.2% and 30.7%, respectively, based on consumed cyclohexane. Upon conversion of the KA to adipic acid and the COP acids to hexamethylenediamine by the procedure described above, a molar ratio of adipic acid to hexamethylenediamine of 1.31 resulted.

EXAMPLE IV

The same reactor as described in the foregoing examples was operated with 5 p.p.m. cobalt naphthenate (calculated as the metal) as the catalyst. Reactor temperature was 153° C., pressure was 500 p.s.i.g., reactor retention time was 28 minutes, and cyclohexane conversion per pass was 18.7%. The molar ratio of oxygen to cyclohexane in the materials fed to the reactor was 0.35 mole of oxygen per mole of cyclohexane. The weight ratio of anhydrous COP acids to KA in the recovered reaction products was 1.5. The yields of 6 carbon COP acids and KA, based upon cyclohexane consumed, were 23.1% and 48.2% respectively. The molar ratio of adipic acid to HMDA resulting when the KA product was converted to adipic acid and the COP product was converted to HMDA by the procedures described in the foregoing examples was 2.33. The HMDA produced, while still satisfactory for commercial nylon salt production, required more purification than that resulting from processing the COP obtained in Examples I and II.

EXAMPLE V

The same reactor as described in the above examples was operated with 2.5 p.p.m. cobalt naphthenate and 2.5 p.p.m. chromium naphthenate (calculated as the metal) as the catalyst. Reactor temperature was 154° C., pressure was 500 p.s.i.g., reactor retention time was 40 minutes, and cyclohexane conversion per pass was 23%. The molar ratio of oxygen to cyclohexane in the materials fed to the reactor was 0.46 mole of oxygen per mole of cyclohexane. The weight ratio of anhydrous COP acids to anhydrous KA in the recovered reaction products was 1.7. The yields of 6 carbon COP acids and KA, based on cyclohexane consumed, were 25.6% and 43.4% respectively. The molar ratio of adipic acid to HMDA resulting when the KA product was converted to adipic acid and the COP product was converted to HMDA by the procedures described in the foregoing examples was 1.91. The HMDA produced, while still satisfactory for commercial nylon salt production, required more purification than that resulting from processing the COP obtained in Examples I and II before meeting the normal industrial specifications for fiber-grade product.

It is to be understood that the foregoing examples are given only by way of illustration and that many variations may be made therefrom without departing from the spirit of our invention.

The embodiments of the invention in which an exclusive property or privilege is claimed are defined as follows:

1. In a process for catalytically oxidizing cyclohexane, in a liquid phase comprising predominantly cyclohexane and its oxygenated derivatives, with a gas comprising molecular oxygen to produce a reaction product comprising oxygenated derivatives of cyclohexane, said process comprising continuously introducing cyclohexane and said oxygen-containing gas into a reaction zone containing said liquid phase having said catalyst dispersed therein and continuously recovering from said reaction zone reaction mass comprising cyclohexane and said oxygenated derivatives, the improvement which comprises:

maintaining said reaction zone at a temperature of from about 135° C. to about 180° C. and at a pressure of from about 100 p.s.i.g. to about 1000 p.s.i.g.;

controlling the introduction of cyclohexane into said oxidation reaction zone at a rate such that the retention time of liquid reactants in the reaction zone is maintained between about 6 minutes and 80 minutes;

maintaining in said oxidation reaction zone from about 1 p.p.m. to about 200 p.p.m., calculated as the metal of an oxidation catalyst selected from the group consisting of hydrocarbon-soluble compounds of chromium and mixtures of said chromium catalysts with hydrocarbon-soluble compounds of cobalt;

controlling the introduction of said oxygen-containing gas into said reaction zone at a rate such that between about 14% and 30% of the cyclohexane introduced into the reaction zone is converted per pass through the reaction zone, said rate amounting to at least 0.05 mole of oxygen per mole of cyclohexane introduced into said zone;

adjusting the two factors, cyclohexane conversion per pass and chromium:cobalt ratio in the oxidation catalyst maintained in the reaction zone, in coordination one with the other, to a level of each such that the reaction mass withdrawn from the oxidation zone contains (a) carboxylic, dicarboxylic, and omega-hydroxycarboxylic acid derivatives of cyclohexane (COP acids) which comprise predominantly hydroxycaproic acid and adipic acid, together with (b) cyclohexanol and cyclohexanone (KA), in a weight ratio of COP acids to KA which is between about 1.5:1 and 3.1:1, said adjustment comprising (a) raising the conversion of cyclohexane per pass by increasing oxygen introduction rate to increase the ratio of COP acids to KA and lowering said conversion to decrease said ratio and (b) as necessary, raising the proportion of cobalt in the catalyst to decrease said ratio and lowering said proportion of cobalt to increase said ratio; and recovering from said reaction mass a fraction comprising predominantly COP acids and a fraction comprising predominantly KA.

2. The improved process of claim 1 further characterized by recirculating the liquid contents of the reaction zone and so maintaining a substantially uniform composition of the reaction mass throughout the bulk of the reaction zone.

3. The improved process of claim 2 wherein the reaction zone temperature is maintained in the range of about 150° C. to 160° C., the pressure is maintained between about 450 p.s.i.g. and 550 p.s.i.g., the reaction zone retention time is maintained between about 35 minutes and about 45 minutes, and the oxidation catalyst maintained in the reaction zone consists essentially of about 2 to 10 p.p.m. of a member of the group consisting of chromium and cobalt-chromium mixtures, in the form of their naphthenate compounds.

4. The improved process of claim 3 wherein the oxidation catalyst is chromium naphthenate in an amount ranging from about 2 p.p.m. to 10 p.p.m., calculated as the metal, and the conversion of cyclohexane is controlled at about 14% to 23% per pass.

5. The improved process of claim 3 wherein the oxidation catalyst consists essentially of a mixture of about 4.8 p.p.m. chromium and about 0.2 p.p.m. cobalt, calculated as the metals, introduced in the form of their naphthenate compounds, and the conversion of cyclohexane is controlled at about 25% per pass.

References Cited

UNITED STATES PATENTS

| 2,703,331 | 1/1955 | Goldbeck et al. | 260—533 |

FOREIGN PATENTS

| 1,002,973 | 9/1965 | Great Britain | 260—533C |
| 956,779 | 4/1964 | Great Britain | 260—533C |

JAMES A. PATTEN, Primary Examiner

R. KELLY, Assistant Examiner